(12) United States Patent
Wang (10) Patent No.: US 6,671,678 B1
(45) Date of Patent: Dec. 30, 2003

(54) MULTI-FUNCTIONAL ARITHMETIC APPARATUS WITH MULTI VALUE STATES

(76) Inventor: Dixing Wang, c/o The College of Mechanical Engineering, No. 15 BeiSanhuan East Road, Beijing 100029 (CN)

( * ) Notice: Subject to any disclaimer, the term of this patent is extended or adjusted under 35 U.S.C. 154(b) by 0 days.

(21) Appl. No.: 09/367,976

(22) PCT Filed: Feb. 25, 1998

(86) PCT No.: PCT/CN98/00027

§ 371 (c)(1),
(2), (4) Date: Nov. 22, 1999

(87) PCT Pub. No.: WO98/38569

PCT Pub. Date: Sep. 3, 1998

(30) Foreign Application Priority Data

Feb. 25, 1997 (CN) .......................... 97100089 A (51) Int. Cl.⁷ ............................... G06F 15/18
(52) U.S. Cl. ............................ 706/15; 706/34
(58) Field of Search .................... 706/15, 23, 33, 706/20, 26, 27, 34; 708/620, 7; 361/756; 327/361

(56) References Cited

U.S. PATENT DOCUMENTS

| | | | | |
|---|---|---|---|---|
| 5,381,352 A | * | 1/1995 | Shou et al. | 708/7 |
| 5,420,806 A | * | 5/1995 | Shou et al. | 708/7 |
| 5,469,102 A | * | 11/1995 | Shou et al. | 327/361 |
| 5,680,515 A | * | 10/1997 | Barhen et al. | 706/34 |

FOREIGN PATENT DOCUMENTS

| | | |
|---|---|---|
| EP | 0631254 | 12/1994 |
| EP | 0756239 | 1/1997 |
| JP | 2366626 | 5/1992 |

* cited by examiner

*Primary Examiner*—Thomas Black
*Assistant Examiner*—Michael B. Holmes
(74) *Attorney, Agent, or Firm*—Birch, Stewart, Kolasch & Birch, LLP (57) ABSTRACT

A multi-functional arithmetic apparatus with multi value-states comprise a gating array, which is composed of gating elements arranged in n row by m column. Each gating element has at least two input terminals and one output terminal, and has input value-states and output value-states. There is operational relationship between the input value-state and the output value-state according to the model of self-organizing principle of integer cluster. The output value-states determine the output based on the gating of the gating element, i.e. the mathematical manipulation is completed by the structure operation. The mathematical manipulation may be addition operation, subtract operation, mixed mode operation and bidirectional logic reversible operation implemented by one add operation and two subtract operations. Multi value-states ALU bit slice which can implement add operation, subtract operation and bidirectional logic reversible operation are provided by utilizing the gating array with carry circuit, borrow circuit and numeral system set peripheral circuit, whereby provides a new multi value-states and parallel process computer.

14 Claims, 7 Drawing Sheets

MULTI-FUNCTIONAL ARITHMETIC APPARATUS WITH MULTI VALUE STATES

This application is the national phase under 35 U.S.C. §371 of PCT International Application No. PCT/CN98/00027 which has an International filing date of Feb. 25, 1998, which designated the United States of America.

FIELD OF THE INVENTION

This invention belongs to the field of data processing technology, specifically, it is a kind of multi-functional arithmetic apparatus with multi-value states, and is the core technology for high speed and high performance computers, computer networks, exchange and control systems.

BACKGROUND OF THE INVENTION

The architecture of the Von Neumann machine has been used on computers that represent the advanced data processing technology until now since 1940s when they were invented. Such a computer is mainly characterized by: firstly, programs are stored in the internal memory and processing is in serial; secondly, the storage address and the storage contents are separated; thirdly, can only execute certain programs passively. Although computer technologies have experienced significant development during the last fifty years, limitations brought forth by the traditional computer architecture become more and more obvious. Since the functions of the hardware of such computers only essentially contains two manipulations, which are shifting and addition, software algorithms are relatively aligned with the hardware functions and structure when the hardware is used for numerical operations. But when it is used for non-numerical operations, the software and hardware are not as aligned, mainly due to the fact that data or knowledge are not related to each other when they are stored and can be related only when they are communicated through the address, whereby such communication can not exceed the limitation of linear two-value logic, and encounters relatively significant limitation during logical inference. The two-value logic is the simplest system in formalization, and must convert each problem into a sum of logically infinite smallness before process one item after another on the same logical layer. Actually, intelligence is the macroscopic effect of the system, its multi-route input information sometimes needs to be interacted and in parallel at the same time, i.e. needs parallel conversion or operation of multiple values or multiple logical layers, and can not be represented completely by two-value or binary trees in two-value logic. Therefore, it is impossible to construct the hardware logic system with the same architecture as that of human brain by using two-value logic. While increasingly growth of the IT industry as well as modern science and technology initiate more and higher demands for computers. In fact, there are unlimited intermediate states between good and bad or existence and non-existence. Therefore, as the information processing tool that mimics human brain, a computer must be able to adapt to the actual demands for information processing. It is hence imperative for the computer to breakthrough the current state of the two-value logic, i.e. there is either 0 or 1, either good or bad, either existence or non-existence, without any intermediate states.

SUMMARY OF THE INVENTION

The object of this invention is to breakthrough the limitation of the existing neural network, and provide a general multi-value logic neural network aimed at resembling the mechanism of structure and function of the neural network of the human brain, based on which to design a kind of multi-value arithmetic apparatus.

The another objective of this invention is to realize reciprocal logic using the operation relationship of addition and subtraction, based on which to design a kind of multi-purpose and multi-state logic reciprocal arithmetic apparatus which combines the functions of operation, exchange and control.

A further objective of this invention is to design in combination of modern microelectronic technology a kind of multi-value arithmetic apparatus bit slice with selectable number systems in the form of bit slices.

This invention has been designed on the basis of integer cluster model—a component of quasi holographic element mathematics model—as the logical structure model. Specifically, it is comprised of a gating array, which is made of gating devices in the structural form of n rows×m columns, with each gating device having at least two input pins and at least one output pins; one of the input pins of each of the gating devices on the same row is connected to each other as a row input contact, the second pin of each of the gating devices on the same column is connected to each other as a column input contact, variable input value states—weight—exist between the row input contacts, similarly, variable input value states—weight—exist between the column input contacts. Also, there is a correspondence relationship between the input value state of each gating device and its position in the array. The value of the input value state of the row input contact shall be in the range of 0 to (n−1), while the value of the input value state of the column input contact shall be in the range of 0 to (m−1); Each output pin of those gating devices also has an output value state. An arithmetic relationship exists between the output value state of each gating device and its input value state based on the self organization principle model of the integer cluster. Output pins of those gating devices with the same operational output value state are connected together via an isolating circuit as an output contact. The output value state of the output contact shall be within the range of 0 to (n+m−1); while the output of the output value state is determined via gating of the gating device.

The relationship between the output value state and input value state of the gating array is defined based on an operational relationship that is represented by the integer cluster model. A certain operational relationship thus exists between the two after definition. While, operation is realized only via the gating of the gating device, i.e. arithmetic operation is realized via the structural operation.

Such a structural operation that is realized via the gating array with multi-value states is characterized by unification of data and address as well as storage and calculation, accommodation between the algorithm and structure, accommodation between the position of the input/output contact and the bit value, accommodation between the operational relationship and the bit value, and direct mapping of the algorithm to the parallel multiple dimension architecture of the information processing system.

Such kind of multi-value and multiple dimension arithmetic array can be widely used in routing selection, exchange matrix, position control, point control, and digital control technologies.

Such mathematics operation can be a dual direction input/output logical reversible operation that is realized by any of addition, subtraction, combination of addition and subtraction, and combination of one addition and two subtraction.

On the basis of the above mentioned multi-value arithmetic apparatus, unification of analog and digital operations as well as unification of data and address can be accomplished by using the modern microelectronic technology and adding external circuits that possess carry, borrow, number system determination, complementary conversion functions to construct a new arithmetic unit bit slice. Such unification can allow new generation computers to breakthrough the limitation of linear two-value logic, and maximize the resemblance with the structure and function of human brain during logical inference.

DETAILED DESCRIPTION OF THE INVENTION

A detailed description of this invention is given below in combination with attached diagrams.

Figure 1:
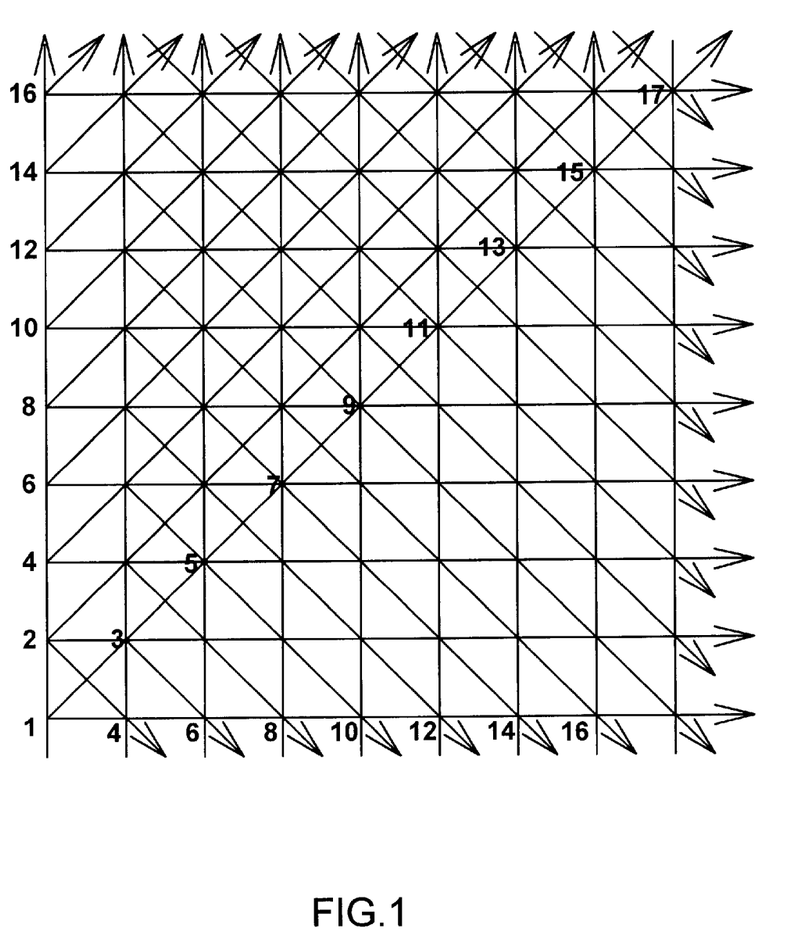
FIG. 1 shows the integer cluster network model of this invention.

First of all, refer to FIG. 1, this invention has been designed on the basis of integer cluster model—a part of the quasi holographic element mathematics model—as the logical structure model. The integer cluster model is self organized based on the addition/subtraction operation relationships, representing the self organizational principle of the complex system structure. The quasi multi-value logical structure model that is abided by the model has the maximum isomorphic resemblance with the human brain, has the capability in composition and conversion of cause-result logical relationship that is similar to the human brain, can suffice to meet the requirements of the system to exchange and communicate information on a real time and two way basis, and is therefore the effective logic foundation of the artificial intelligence system. In this model, assuming that each parameter would represent a memory content or subsystem, then there should be an inherent logical relationship between contents or subsystems, i.e. the self organizational relationship among certain type of parameters. Therefore, this model is the self organizational principle model of the group of parameters.

It is seen from FIG. 1 that, if each parameter is seen as an input/output point or input/output pin, then each point or pin would have a different value state, i.e. the multi-value principle. Such multi-value state can be freely extended or expanded, i.e. intermediate state values can be inserted freely between the two values. The arithmetic unit based on this theory will be able to define any kind of number system without being limited by the binary code operation, and is able to perform operations on any kind of number systems.

FIG. 1 defines an operational relationship and principle— i.e. an operational or logical relationship exists among the parameters based on the input or output relationship.

Specifically, such an operational relationship can realize its operational functions by using various circuit structures. Please refer to FIGS. 2, 3, 4, the multi-functional arithmetic unit with multi-value states of this invention is comprised of a gating array, which is made of gating devices (100) based on the structure of n rows×m columns, where the gating device (100) is a device that has the gating function, each gating device (100) must have at least two input pins and at least one output pin; one of the input pins of each of the gating devices (100) on the same row is connected together as a row input contact, the other input pin of each of the gating devices (100) on the same column is connected together as a column input contact, variable input value states—weight—exist between the row input contacts, similarly, variable input value states—weight—exist between the column input contacts. Also, there is a correspondence relationship between the input value state of each gating device (100) and its position in the array. The value of the input value state of the row input contact shall be in the range of 0 to (n−1), while the value of the input value state of the column input contact shall be in the range of 0 to (m−1); Each output pin of that gating device (100) also has an output value state. An arithmetic relationship exists between the output value state of each gating device (100) and its input value state based on the self organization principle model of the integer cluster. Output pins of those gating devices (100) with the same operational output value state are connected together via an isolating circuit as an output contact. The output value state of the output contact shall be within the range of 0 to (n+m−1); while the output of the output value state is determined via gating of the gating device.

Figure 2:
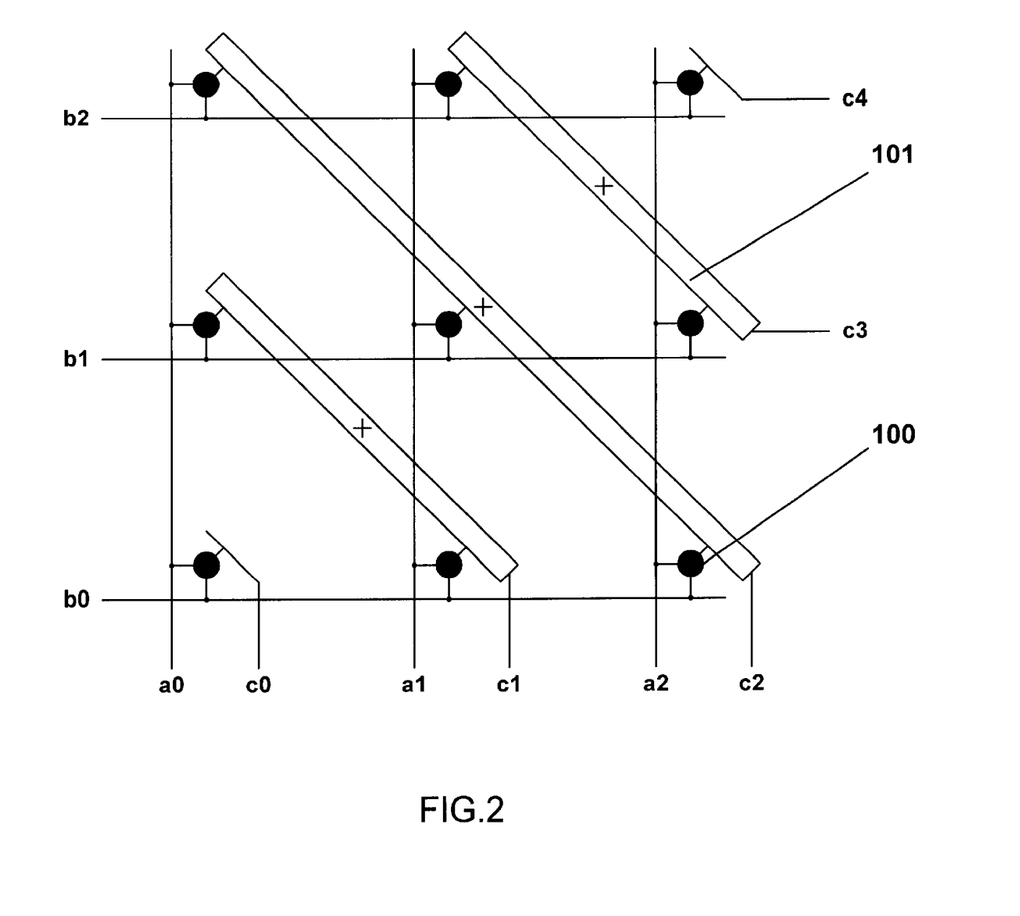
FIG. 2 shows the principle diagram of the addition operation unit designed for logical structure model based on FIG. 1.
Figure 3:
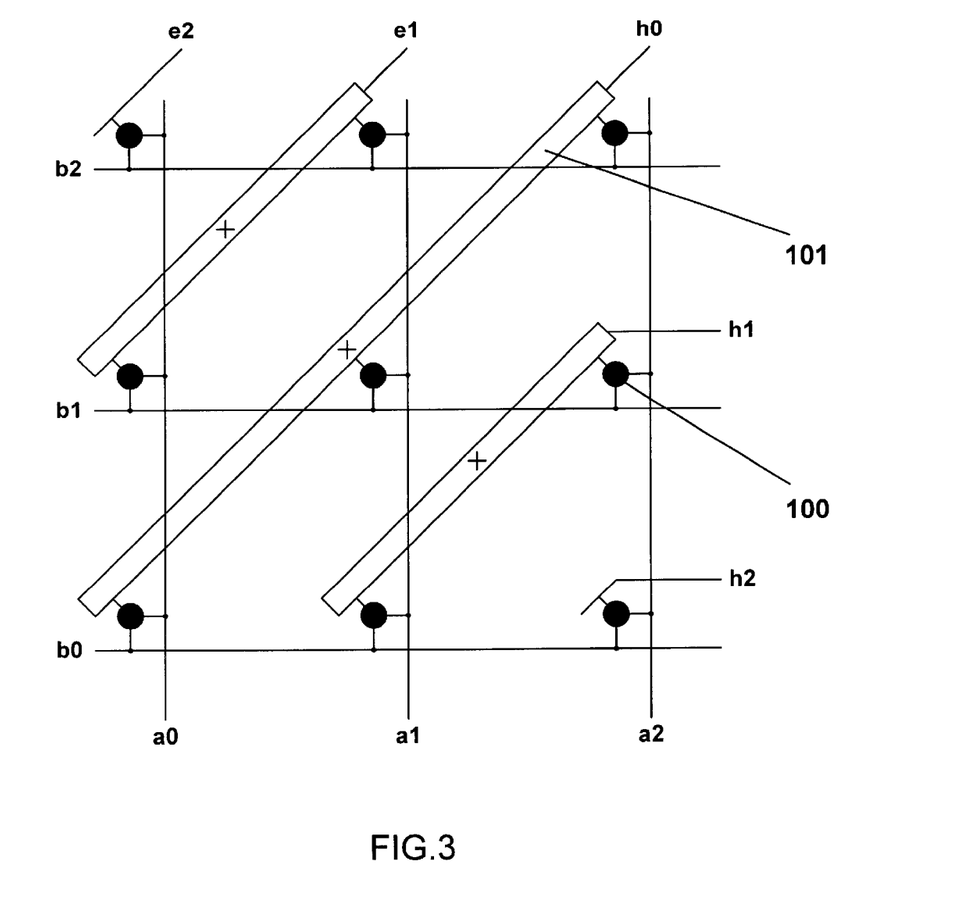
FIG. 3 shows the principle diagram of the subtraction operation unit designed for logical structure model based on FIG. 1.
Figure 4:
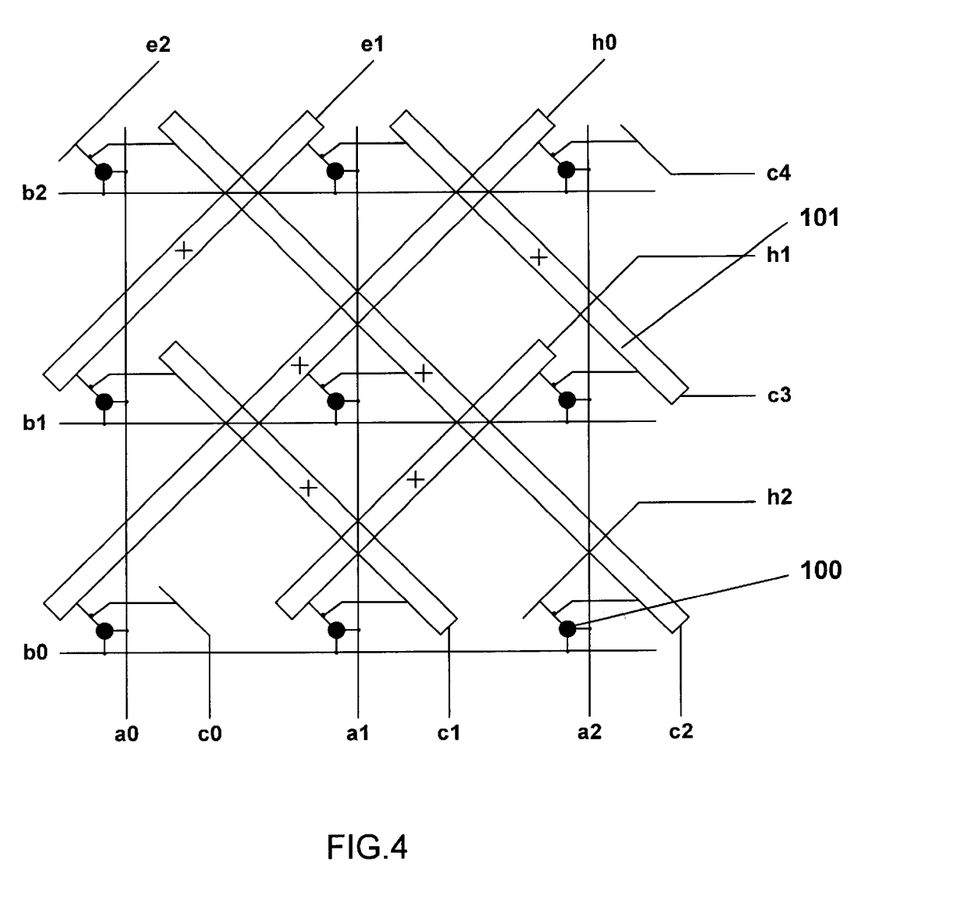
FIG. 4 shows the principle diagram of the addition/subtraction combination operation unit designed for logical structure model based on FIG. 1.

It is seen from the above statement that, the relationship between the output value state and input value state of the gating array can be defined based on the operational relationship represented by the above mentioned integer cluster model. Certain operational relationship exists between the two via such definition, while operation is realized via gating of the gating device, i.e. mathematics operation is accomplished via structural operation.

Only such a structural operation that is realized via the gating array with multivalue states can ensure unification of data and address as well as storage and calculation, accommodation between the algorithm and structure, accommodation between the position of the input/output contact and the bit value, accommodation between the operational relationship and bit value, and direct mapping of the algorithm to the parallel multiple dimension architecture of the information processing system.

Please refer to FIG. 2, which shows a multi-value states and multi-functional arithmetic unit that uses a kind of addition operation relationship and can realize the addition operation function, which has two inputs a and b, and one output c, and which is defined by a+b=c, taking the column input contacts as a0–a2 with a total of three value states, and taking the row input contacts as b0–b2 with a total of three value states, whereby the output contacts are c0–c4 with a total of five value states. The definition of input and output value states represents the addition operation relationship.

Please refer to FIG. 3, which shows the multi-value states and multi-functional arithmetic unit with subtraction operation relationship and subtraction operation function, which has two inputs a and b, two outputs h (plus) and e (minus), which is defined by a−b=h (plus) or e (minus), taking the column input contacts as a0–a2 with a total of three values states, and taking the row input contacts as b0–b2 with a total of three value states, whereby the output contacts (plus) are h0–h2 with a total of three values states, and the output contacts (minus) are e1–e2 with a total of two value states, the definition on input/output value states represents subtraction operation relationship.

Please refer to FIG. 4, which shows the multi-value states and multi-functional arithmetic unit which represents addition and subtraction operation relationship and can realize addition and subtraction operation functions, and which combines the addition operation relationship structure and subtraction operation relationship structure, with the definition on input/output value states representing both addition and subtraction operation relationships.

Figure 5:
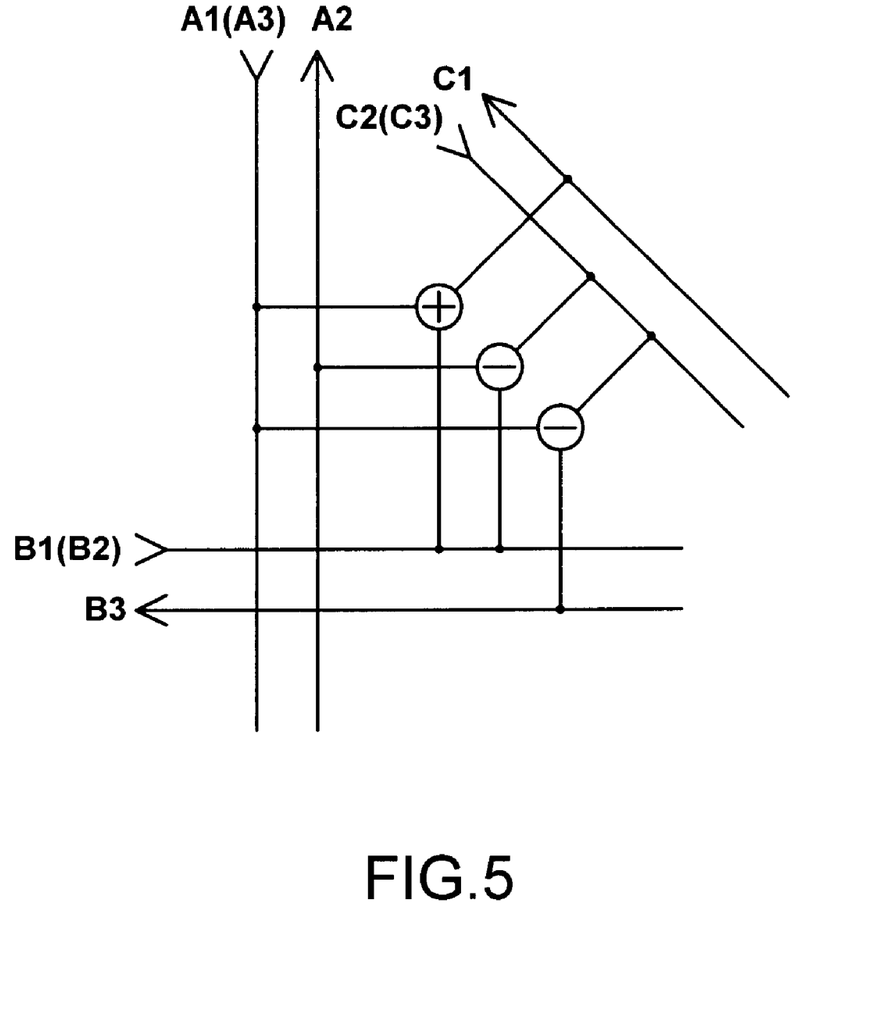
FIG. 5 shows the principle diagram of the logical reversible operation unit based on combination of one addition and two subtraction operations.

Please refer to FIG. 5, which shows combination of one addition and two subtraction operation relationship structures, with six ports after consolidation, three inputs, and three outputs. Inputs A1 (A3) and output A2 are represented by port A consistently, inputs B1 (B2) and output B3 are represented by port B consistently, inputs C2 (C3) and output C1 are represented by port C consistently, since A1+B1=C1, C2−B2=A2, and C3−A3=B3, therefore the relationship of A+B=C, C−B=A, C−A=B is realized, which can realize logically reversibility and two way input/output operation, and can expand the input/output ports at the same time, and can more strongly centralize and consolidate exchange, operation and control functions. If signal is inputted via any two of the three ports A, B, and C simultaneously, then operation can be realized. If setting is made from one port, then the other two ports can realize two way mutually and synchronous exchange. Control is made possible by making use of the mutually complementary relationship of ports A and B with respect to port C as well as the logically reversible relationship and operational relationship among ports A, B and C.

The above mentioned multi-value states and multiple dimension operational array can be widely used in routing selection, exchange matrix, position control, point control, and digital control technologies, where the gating device (100) can be either a digital gate, e.g. an AND gate, or an analog transmission gate, the isolation circuit (101) can have either an OR gate, or an operational amplifier. The gating device (100) can have either two inputs and one outputs, or two inputs and two outputs, or multiple inputs and multiple outputs.

On the basis of the above mentioned multi-value arithmetic unit, unification of analog and digital operations as well as unification of data and address can be accomplished by using the modern microelectronic technology and adding external circuits that have carry, borrow, number system determination, complementary conversion functions, to construct a new arithmetic apparatus bit slice. Such unification can deemed as the most basic feature of the new generation computer in resemblance with the human brain in terms of structure and functions.

Figure 6:
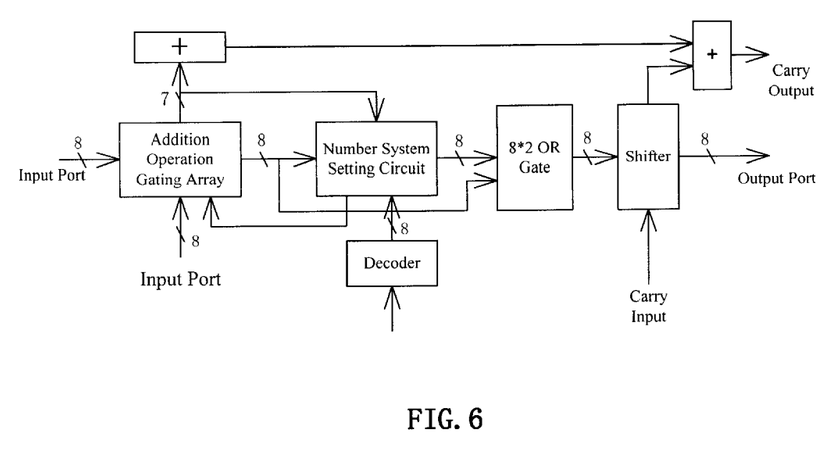
FIG. 6 shows the principle diagram of the addition arithmetic unit bit slice constructed by adding carry and number system determination on the basis of FIG. 2 as the core.
Figure 7:
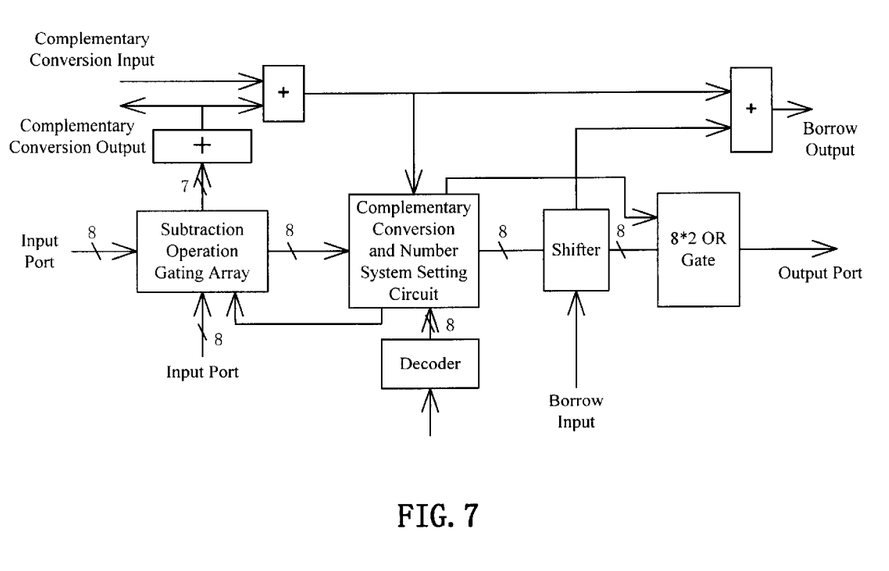
FIG. 7 shows the principle diagram of the subtraction arithmetic unit bit slice constructed by adding borrow and number system determination on the basis of FIG. 3 as the core.

Please refer to FIGS. 6 and 7, which show the circuit principle diagram of the addition arithmetic unit bit slice and subtraction arithmetic unit bit slice with added design of carry, borrow, and number system determination functions based on the above mentioned gating array.

FIG. 6 shows the addition operation relationship and its gating array, accommodated with the shifter—with the function to accept input of carry from lower bits and then take output, the three-eight decoder—with the function to pre-select the number system or determine the input value range, and the number system setting circuit, thus forming the addition arithmetic unit bit slice, which has a total of two input ports, one output port (e.g. each is defined with 8 pins to adapt to the number system treatment below the octal system), one carry input pin and one carry output pin. Therefore, multiple bit addition arithmetic unit can be constructed using combination of multiple bit slices via carry circuits.

FIG. 7 shows the subtraction operation relationship and its gating array, accommodated with the shifter, the three-eight decoder—with the function to pre-select the number system or determine the input value range, complementary conversion circuit, and the number system setting circuit, all of which form the subtraction arithmetic unit bit slice, which has a total of two input ports, one output port (e.g. each is defined with 8 pins to adapt to the number system treatment within the octal system), one borrow input pin and one borrow output pin, as well as one input and one output for the complementary conversion. Therefore, multiple bit subtraction arithmetic unit can be constructed using combination of multiple bit slices via carry circuits.

Setting of input value states and number system can be selected within the maximum range of design value states via the decoder, i.e. the upper limit and the number system are selected by the decoder within a specific range of value states. For instance, the setting of 8 value states can be selected within the binary-octal range—using the three-eight decoder, the setting of 16 value states can be selected within the binary-hexadecimal range—using the four-sixteen decoder, it is therefore suitable to operation, exchange, and control of codes of different number systems.

An addition and subtraction arithmetic unit bit slice can not only form an addition subtraction arithmetic unit with the bit slice in the form of multiple bit cascade, but also expand the value range of a bit slice via splicing, e.g. an 8 value states bit slice can be converted into a 16 value states bit slice.

When the operational relationship of the gating array of the above mentioned arithmetic unit bit slice is a combination of addition and subtraction operational relationship, it can form a multiple function arithmetic unit bit slice that can output both addition and difference simultaneously if equipped with external circuits.

When the operational relationship of the gating array of the above mentioned arithmetic unit bit slice is the combination of one addition and two subtraction operation relationship, it can form the arithmetic unit bit slice that is featured by logical reversibility as well as two way input/output multiple purpose and multi-value states if equipped with external circuits. A new kind of multi-value states parallel processing computer can be made of this new multi-purpose multi-value states logical reversible arithmetic unit bit slice equipped with the command register parallel processing, the one-two distributor, the one of two circuit, and the dual port RAM. Such a computer is featured by breaking through the limitation of two value operation; having logical reversibility and two way input/output; unification of address and data; selection and setting of number systems; openness; eliminating additional operations. It can be widely used in the field such as control, data processing, communications exchange, and computer networks, and will be able to make the interface of new generation computers based on it more user friendly, man-machine interaction more vivid, and will be more resembling the functions of human brain with its parallel self organizational structure algorithm. It will bring forth a computer revolution as compared with the existing Von Neumann computer.

What is claimed is:

1. A multi-value states multi-functional arithmetic apparatus, characterized by: said apparatus is comprised of a gating array, which is made of gating devices based on the structure of n rows×m columns, each gating device has at least two input pins and at least one output pin, one of the input pins of each of the gating devices on the same row is connected to each other as a row input contact, the other input pin of each of the gating devices on the same column is connected to each other as a column input contact, variable input value states—weight—exist between the row input contacts, similarly, variable input value states—weight—exist between the column input contacts, and, there is a correspondence relationship between the input value state of each gating device and its position in the array, the value of the input value state of the row input contact shall be in the range of 0 to (n−1), while the value of the input value state of the column input contact shall be in the range of 0 to (m−1), Each output pin of that gating device also has an output value state, an arithmetic relationship exists between the output value state of each gating device and its input value state based on the self organization principle model of the integer cluster, the output pins of those gating devices with the same operational output value state are connected together via an isolating circuit as an output contact, the output value state of the output contact shall be within the range of 0 to (n+m−1); while the output of the output value state is determined via gating of the gating device, wherein n>1 and m>1.

2. The multi-value states multi-functional arithmetic apparatus according to claims 1, characterized by: said operation relationship is addition operation, the output value states of each of said gating device is equal to the addition of its row input value state and column input value state; the number of row input contacts is n, the number of column input contacts is m, the number of output contacts is (n+m−1).

3. The multi-value states multi-functional arithmetic apparatus according to claims 1, characterized by: said operation relationship is subtraction operation, the output value states of each of said gating device is equal to the difference of its row input value state and column input value state; the number of row input contacts is n, the number of column input contacts is m, the number of output contacts is (n+m−1).

4. The multi-value states multi-functional arithmetic apparatus according to claim 1, characterized by: said operation relationship is a combination of one addition operation and one subtraction operation, the output pins of the gating devices with the identical output value states that are determined by the addition operation relationship are connected together via an isolation circuit as the addition output contact, the output pins of the gating devices with the identical output value states that are determined by the subtraction operation relationship are connected together via an isolation circuit as the subtraction output contact, the number of said row input contacts is n, the number of said column input contacts is m, the number of said output contacts is 2(n+m−1).

5. The multi-value states multi-functional arithmetic apparatus according to claim 1, characterized by: said operation relationship of said n row×m column gating array is addition, said row input contacts are connected to an input port (A1), said column input contacts are connected to an input port (B1), said output contacts are connected to an output port (C1); wherein further including two n row×m column gating arrays with the operation relationship being subtraction, for one of said two arrays, the row input contacts are connected to an input port (C2), the column input contacts are connected to an input port (B2), the output contacts are connected to an output port (A2); for another of said two arrays, the row input contacts are connected to an input port (C3), the column output contacts are connected to an input port (A3), the output contacts are connected to an output port (B3), the input port (A1) is connected to the port (A3), the input port (B1) is connected to the port (B2), the input port (C2) is connected to the port (C3).

6. The multi-value states multi-functional arithmetic apparatus according to claim 1 characterized by: said gating device is a digital gate, the isolation circuit is digital OR gate.

7. The multi-value states multi-functional arithmetic apparatus according to claim 1 characterized by: said gating device is an analog transmission gate, said isolation circuit is an operational amplifier.

8. The multi-value states multi-functional arithmetic apparatus according to claim 1 characterized by: said gating array can form a multi-value states multi-functional arithmetic unit bit slice if equipped with additional external circuits.

9. The multi-value states multi-functional arithmetic apparatus according to claim 8, characterized by: n=8, m=8, said operational relationship of said gating array is addition operation, said external circuits include: a shifter which accepts lower bit inputs and then takes outputs, a decoder that pre-selects the number system or defines the value states, a number system determination circuit, said bit slice has two input ports, one output port, one pin for carry input, and one pin for carry output.

10. The multi-value states and multi-functional arithmetic apparatus according to claim 9, characterized by: said bit slice can not only construct the addition arithmetic unit by the form of multiple bit cascade, but also expand the value range of a bit slice via splicing.

11. The multi-value states multi-functional arithmetic apparatus according to claim 9, characterized by: the value state and number system are selected and set via said decoder, i.e. the upper limit and number system of the input value states are selected and set within a pre-determined value states range using the decoder.

12. The multi-value states multi-functional arithmetic apparatus according to claim 8, characterized by: n=8, m=8, said operational relationship of said gating array is subtraction operation, said external circuits include: a shifter which accepts lower bit borrow inputs and then takes outputs, a decoder that pre-selects the number system or defines the value states, a complementary conversion circuit, a number system determination circuit, said bit slice has two input ports, one output port, one pin for input of the complementary conversion circuit, one pin for output of the complementary conversion circuit, one pin for borrow input, and one pin for borrow output.

13. The multi-value states and multi-functional arithmetic apparatus according to claim 12, characterized by: said bit slice can not only construct the subtraction arithmetic unit by the form of multiple bit cascade, but also expand the value range of a bit slice via splicing.

14. The multi-value states multi-functional arithmetic apparatus according to claim 12, characterized by: the value state and number system are selected and set via said decoder, i.e. the upper limit and number system of the input value states are selected and set within a pre-determined value states range using the decoder.

* * * * *